United States Patent [19]
Norris

[11] 3,943,259
[45] Mar. 9, 1976

[54] PREPARING FLUID SHORTENING FOR USE IN YEAST RAISED BAKERY PRODUCTS

[75] Inventor: Max E. Norris, Parma, Ohio

[73] Assignee: SCM Corporation, New York, N.Y.

[22] Filed: Mar. 6, 1975

[21] Appl. No.: 555,963

Related U.S. Application Data

[60] Division of Ser. No. 434,128, Jan. 17, 1974, Pat. No. 3,914,452, which is a continuation-in-part of Ser. No. 361,320, May 17, 1974, abandoned.

[52] U.S. Cl. .................. 426/24; 426/612; 426/606
[51] Int. Cl.$^2$........................................... A23D 5/00
[58] Field of Search...................... 426/606, 612, 24

[56] References Cited
UNITED STATES PATENTS 2,968,563  1/1961  Houser................................ 426/612
2,968,564  1/1961  Schroeder et al.................. 426/612

*Primary Examiner*—Joseph M. Golian
*Attorney, Agent, or Firm*—Thomas M. Schmitz

[57] ABSTRACT

A stabilized fluid shortening containing conditioning agents and softening agents for use in baking comprises about 4 to 14 weight parts of soft mono- and diglycerides, 2 to 8 weight parts ester emulsifier, 0 to 8 weight parts of solid stearine, and between about 40 to 100 weight parts liquid vegetable oils wherein the fluid shortening is a stabilized dispersion. The fluid shortening can be produced as a concentrate and can be hydrated with water to produce a hydrated fluid shortening.

1 Claim, No Drawings

PREPARING FLUID SHORTENING FOR USE IN YEAST RAISED BAKERY PRODUCTS

This application is a division of application Ser. No. 434,128 filed Jan. 17, 1974, now U.S. Pat. No. 3,914,452, which was a continuation-in-part of Ser. No. 361,320 filed May 17, 1974, and now abandoned.

BACKGROUND OF THE INVENTION

Fluid shortening is useful in the preparation of baked goods and bread-making processes. The function of fluid shortenings is similar to plastic shortenings in baking processes, but fluid shortenings are much preferred for use in commercial baking process due to the ease in handling, pumping, and metering. Fluid shortenings characteristically are fluid at temperature of about 60° to 100°F and should not become unstable in storage over this temperature range or in use by separation into two distinct liquid phases or liquid-solid phases to produce a supernatent liquid phase and a precipitate phase. Fluid shortenings should possess a stabilized fluid consistency wherein the viscosity remains relatively consistent over a wide temperature range.

Fluid shortenings or fat composition are known in the art which suggest fluid shortenings based on hard mono- and diglycerides having an iodine value of less than 15 and usually about 0 to 5. Problems have occurred in conventional prior art fluid shortenings, however, wherein the fluid shortenings have a tendency to firm or solidify upon encountering temperatures below 50°F and/or above 85°F. Other suggested conventional liquid shortenings containing stable suspensions of about 5 to 7% finely divided saturated solid fatty acid hard glycerides lack sufficient solid fat for use in a continuous-mix bread-making process in addition to having stability of only about 30 days. Still other prior art fluid shortenings are based on solid hydrogenated hard fats to overcome oxidation instability but unfortunately are of high viscosity and become unmanageable with varying winter and summer temperatures.

These and other deficiencies in prior art fluid shortenings are overcome by the fluid shortening of this invention based on soft mono- and diglycerides having an iodine value greater than about 40.

It now has been found that a stabilized fluid shortening comprising minor amounts of soft mono- and diglycerides, ester emulsifiers, and soybean stearine dispersed in vegetable oil produces a fluid shortening having substantially increased physical stability.

Further advantages are realized wherein the fluid shortening of this invention is particularly suitable for efficient use in the continuous-mix bread-making process, conventionally processed white breads and variety breads, and conventionally processed buns, rolls, and brown-and-serve rolls as well as other conventionally processed yeast-raised products.

A further advantage is that the fluid shortening maintains extended fluidity suitable for pumping and metering wherein the fluid shortening may be pumped directly from a fat storage tank without intermediate blending of the conditioning agent as the same is dispersed in the liquid vegetable oil with the softening agent.

Still further advantages include excellent viscosity control achieved upon extended storage wherein viscosity change of the shortening is minimal upon constant cycling between 50°F and 100°F.

A further advantage is that the ester emulsifier, soft mono- and diglycerides, and soybean stearine remain stably dispersed within the liquid oil over a wide temperature range.

Still further advantages include bread produced which is significantly softer and with greater loaf volume than produced by both prior known fluid and plastic bread shortening systems.

These and other advantages will become more apparent from the detailed description of the invention.

SUMMARY OF THE INVENTION

The fluid shortening of this invention contains by weight about 4 to 14 weight parts of soft mono- and diglycerides, 2 to 8 weight parts of ester emulsifier, 0 to 8 weight parts of solid stearine, and at least about 40 weight parts of liquid vegetable oil. The fluid shortening is a stabilized dispersion in vegetable oil and contains a ratio of mono- and diglycerides to the ester emulsifiers in the range of 80/20 to 20/80, and preferably of about 55/45 to 65/35 by weight. The stabilized fluid shortening is produced by melting a blend of the foregoing components at temperatures sufficient to force a melt, votating the blend at temperatures of about 82° to 86°F, and fluidizing or stehling the votated mixture to obtain substantially 100% conversion to the stable beta-polymorphic form.

DETAILED DESCRIPTION OF THE INVENTION

The stabilized fluid shortening of this invention is produced from a suitable blend of minor amounts of soft mono- and diglycerides, soybean stearine, and ester emulsifiers, all dispersed in major amounts of liquid vegetable oil to maintain a substantially uniform dispersion.

The soft mono- and diglycerides are essential and generally are a mixture of unsaturated and saturated glycidal esters of fatty acids typically derived from hydrogenated and non-hydrogenated vegetable oils such as soybean oil, corn oil, olive oil, peanut oil, safflower oil, cottonseed oil, palm oil, and like vegetable oils, and animal fats such as tallow and lard. The ratio of monoglycerides to diglycerides in conventional soft monoand diglycerides typically is about 40 to 60 weight percent monoglyceride to about 35 to 45 weight percent diglycerides and minor amounts of 5 to 14% triglycerides, and such soft mono-, di- and triglyceride mixtures are commercially available. The soft mono- and diglycerides have an iodine value in the broad range of about 40 to 150 and may be prepared from hydrogenated and non-hydrogenated vegetable oils or animal fats. Soft mono- and diglycerides derived from vegetable oils preferably have an iodine number between about 65 to 150, whereas the animal fats preferably have an iodine number of about 40 to 65. The preferred iodine number range of the soft mono- and diglycerides is between about 40 and 85. Soft mono- and diglycerides may be plastic in consistency and typically may have a capillary melting point as high as 120°F. The acid number of soft mono- and diglycerides is less than 2 and the peroxide value thereof should be less than 1, in accordance with conventional specifications of mono- and diglycerides commercially available.

The fluid shortening of this invention further includes between about 2 to 8 parts of ester emulsifier for use as dough conditioners. The ester emulsifiers are selected from ethoxylated esters such as polyoxyethylene sorbitan monostearate, polyoxyethylene monooleate, polyoxyethylene sorbitan tristearate that are obtained by condensing ethylene oxide with sorbitan and mannitan esters. Other desirable ethylene oxide condensation products are ethoxylated propylene glycol monoesters (U.S. Pat. No. 3,767,822) and ethoxylated triglycerol monostearate (U.S. Pat. No. 3,784,709). Additional effective ester emulsifiers are sodium stearoyl-2-lactylate, calcium stearoyl-2-lactylate, sodium stearoyl-1-lactylate and succinylated monoglycerides. The preferred ester emulsifier is ethoxylated glycerides comprising mono- and diglycerides and essentially no triglycerides although the ethoxylated glycerides may contain up to about 3% triglycerides. Ethoxylated mono- and diglycerides are often referred to in the art as ethoxylated monoglycerides. Ethoxylated monoglycerides are the particularly preferred ester emulsifier due to excellent functional properties imparted to bread mixes. Functionality pertains to the ability of the emulsifier to interact and condition the protein of the flour of bread mixes. Functionality is particularly important in continuous bread-making process.

Ethoxylated monoglycerides are ethoxylated mono- and diglycerides being polyethoxylated fatty acid esters of glycerol, predominantly mono esters of glycerol, and may be conventionally described as a mixture of stearate, palmitate, and lesser amounts of myristate partial esters of glycerin condensed with approximately 20 moles of ethylene oxide per mole of alpha-monoglyceride reaction mixture such as set forth in The Food Codex and FDA Regulations, and more particularly set forth in the Egan patent, U.S. Pat. No. 3,433,645, and incorporated herein by reference. The fatty acid radicals of ethoxylated monoglycerides preferably are higher fatty acid chains having about 12 to 18 carbon atoms and the glycerol ester preferably contains about 18 to 22 moles of ethylene oxide per mole of glycerol ester. Suitable ethoxylated monoglycerides for this invention have a hydroxyl value of about 65 to 80, a saponification number of about 60 to 80, an acid values less than about 2, and an oxyethylene content of about 55 to 75 weight percent based on the total ethoxylated glycerides composition. The capillary melting point of ethoxylated mono- and diglycerides is between about 75° to 95°F and preferably between about 80° to 90°F. Ethoxylated monoglycerides may be prepared by reacting ethylene oxide with a mono- and diglyceride mixture at temperatures of about 145° to 175°C, such as suggested in the Egan patent, U.S. Pat. No. 3,490,918, and incorporated herein by reference.

The foregoing described soft mono- and diglycerides hereinbefore described and the ethoxylated mono- and diglycerides are preferably contained in the fluid shortening in a wide range of a weight ratio of about 80 to 20 weight parts of soft mono- and diglycerides to 20 to 80 weight parts of ethoxylated mono- and diglycerides. Preferably, the weight ratio may range from about 55/45 to 65/35; and the most preferred ratio is about 60 weight parts of soft mono- and diglycerides to about 40 weight parts of ethoxylated monoglyceride.

The fluid shortening of this invention further can include minor amounts of solid stearine within the dispersed blend. Stearines useful in this invention are derived from beta-tending fats such as, for example, soybean oil, peanut oil, safflower oil, and hydrogenated lard. Beta-tending solid stearines may be identified by x-ray diffraction wherein polymorphic forms are identified using a Phillips X-ray Diffractometer goniometer coupled with a strip chart recorder. The goniometer has a scanning range of 17.0° to 25.0 ° wherein beta-polymorphic form displays identifying peaks at 19.4°, 23.0°, and 24.0°, respectively. The iodine value of solid stearines may range from 0 to 15 and preferably 0 to 5. The capillary melting point of the solid stearines advantageously ranges from 135° to 155°F, and preferably 140° to 145°F. The preferred solid stearine is soybean stearine having an iodine number of about 0 to 5 and derived from hydrogenated soybean oil.

The foregoing components are dispersed within major amounts of liquid vegetable oils, commonly referred to as lipids, and primarily consisting of triglycerides wherein at least about 90 weight percent and preferably above 95 weight percent of the vegetable oil are glycidal esters. Suitable liquid vegetable oils include, for example, soybean oil, peanut oil, mustardseed oil, safflower seed oil, corn oil, and like vegetable oils. Suitable liquid vegetable oils for this invention have an iodine value between about 90 to 150 and preferably 120 to 130. The liquid vegetable oils are liquid at room temperature and preferably have a melting point of less than 50°F. Preferred liquid vegetable oils include soybean oil, and high oleic safflower seed oil.

In practice, the fluid shortening of this invention is produced by mixing on a weight basis about 4 to 14 weight parts of soft mono- and diglycerides, 2 to 8 weight parts of ethoxylated monoglycerides, 0 to 8 weight parts of solid or hard stock stearine, and the balance being at least about 40 weight parts of liquid vegetable oil. Desirably, 2 to 8 weight percent of solid stearine and preferably 4 to 6 weight parts of solid stearine are utilized with at least 50 weight parts of liquid vegetable oil. The fluid shortening components are heated to a temperature sufficient to liquefy all of the components which usually requires temperatures of about 130° to 150°F whereby a substantially uniform liquid blend results. The liquid blend is then passed through a swept-surface heat exchanger for quickly chilling the liquid blend to initiate beta-crystal formation within the chilled liquid blend. The temperature of the blend in the swept-surface heat exchanger is quickly reduced to at least 85°F, preferably about 80° to 85°F, and maintained at this temperature until the chilled blend exits from the swept-surface heat exchanger. A suitable swept-surface heat exchanger for the purpose of this invention is a commercially available "Votator" A type unit chilling machine as described in detail in U.S. Pat. No. 3,011,896. The Votator A unit causes fat crystals to form and become dispersed within the liquid vegetable oil and further initiates beta-crystal formation. The chilled blend containing fat crystals and having a temperature of about 80° to 85°F is then passed to a holding tank for working by mildy agitating the chilled blend to a product of desirable consistency. The holding tank may be similar in construction to the swept-surface heat exchanger and sometimes is referred to as a Votator B Unit which merely agitates the chilled blend to allow betacrystallization to develop. The Votator B unit further maintains the chilled blend temperature at about 82° to 88°F whereby fat crystals continue to form within the chilled blend. The Votator B unit mildly agitates the chilled blend being passed therethrough on a continuous basis for about 1 minute to work the chilled blend into a substantially uniform dispersion wherein the fat crystals dispersed in the vegetable oil are in equilibrium with the liquid vegetable oil. The Votator B unit further provides for removing any localized heat released during the continued formation of fat crystals and the temperature of the chilled blend is maintained between 82° and 88°F. Formation of beta-crystals within the chilled blend depends on effectively maintaining the temperature of the chilled blend between 82° and 88°F while passing through the Votator B unit. If temperatures of the blend fall below 82°F, unacceptable viscosities result, whereas blend temperatures above 88°F tend to produce liquid shortenings with considerably reduced stability. Maintenance of blend temperatures between 82° and 88°F is particularly necessary in this invention due to the varied and multiple melting points of the various components of the fluid shortening. In this regard, the soft mono- and diglycerides have melting points up to about 120°F; the hard stock solid stearine has a melting point between about 135° and 155°F; the ethoxylated monoglycerides have a melting point between about 80°F and 90°F; and the liquid vegetable oil usually has a melting point below 50°F. Hence, it has been found that the temperature of the chilled blend of components must be maintained between 82° and 88°F, preferably 84° to 86°F, while passing through the Votator B unit. The components, although having a wide variation in melting points, appear to be effectively stabilized and uniformly dispersed within the liquid vegetable oil to provide remarkable stable uniform dispersion.

Although not intended to be bound by theory, it is believed that the liquid vegetable oil serves as a continuous-phase matrix for the other components wherein the solid hard stock stearine initially crystallizes within the liquid vegetable oil matrix upon rapid cooling in the swept-surface heat exchanger. Upon further cooling, the soft mono- and diglycerides are believed to associate with the solid hard stock stearine so as to hold the beta-tending stearines suspended within the vegetable oil since the soft mono- and diglycerides have limited affinity for both the oil and the solid hard stock stearine. Further cooling in the critical range of 82° to 86°F is believed to cause the lower melting point ethoxylated monoglycerides as well as solid hard stock stearine and soft mono- and diglycerides to become suspended within the matrix of oil providing a stabilized dispersion wherein said components are stably dispersed within the liquid vegetable oil matrix. Nevertheless, substantial deviations from maintaining the temperature of the blend between 82° and 86°F in the holding tank result in the fluid shortening having abnormally high and undesirable viscosities as well as loss of physical stability.

After processing is completed in the Votator B unit, sometimes referred to as Votation, the resulting stabilized uniform dispersion mixture is then passed to a stehling tank for continuous agitation or fluidization at temperatures between about 80°F to 90°F, advantageously 82° to 88°F, and preferably 84° to 86°F. Fluidization continues for time sufficient for complete conversion of the fat crystals to the beta-crystal, that is, at least 90% conversion and preferably 95 to 100% conversion to the beta-crystal form. Fluidization continues for extended periods and up to about 24 to 48 hours for diluted dispersion mixtures to form a completely stabilized suspension of predominantly beta-crystals suspended within the liquid vegetable oil matrix to produce the stabilized fluid shortening of this invention. The resulting fluid shortening of this invention has superior stability upon repeated temperature cycling between 50° and 100°F and maintains the stable dispersion for at least about 3 months.

A further advantageous aspect of this invention is that fluid shortening containing not greater than about 5% by volume entrapped air or other gas advantageously prolonged the stability of the fluid shortening even longer. Physical stability was maintained, but even more surprisingly, viscosity characteristics as a function of time and temperature were substantially improved in low gas systems. In a temperature range of 50° to 100°F, for example, fluid shortening having a viscosity of about 730 cps and having less than 5% entrapped air possessed improved viscosity control over a six-week period wherein viscosity increases were about one-half than when compared to commercial fluid shortening containing greater than five percent entrapped air by volume. Accordingly, the preferred fluid shortening of this invention contains not greater than about 5% air by volume.

A further advantageous aspect of this invention is that a concentrate of fluid shortening may be produced and held in storage facilities and thereafter diluted for use in baking processes. Producing liquid in concentrated form increases processing efficiency by necessitating less material through-put in the processing as well as conserving storage space and energy requirements. Much shorter processing times are realized in the melting step, the quick chilling step, in the Votator A unit, the working step in the Votator B unit, and the fluidizing step as compared to processing diluted fluid shortening. The fluidizing step, for example, may be reduced to about 6 hours to 24 hours when only 50 weight parts of liquid vegetable oil are utilized to produce a concentrated fluid shortening. Varying concentrated liquid shortenings can be produced by varying the amount of vegetable oil to between 50 to 100 weight parts of vegetable oil wherein 100 parts of vegetable oil represents full strength fluid shortening. The concentrated fluid shortening may be then stored and diluted with additional vegetable oil prior to use in baking processes, that is, increase the vegetable oil level to about 100 weight parts in the fluid shortening mixture. When additional vegetable oil is added, the diluted mixture is then again simply fluidized at temperatures of about 80° to 90°F for about 4 hours to 10 hours to produce a stabilized fluid shortening having complete beta-formation, that is, 95 to 100% crystals. Further advantages of the concentrate is that even further increased stability is achieved with the concentrate wherein the concentrated fluid shortening has increased stability of about 50% over the extended three to four month stability realized by the diluted fluid shortening of this invention. The concentrated fluid shortening comprises 4 to 14 weight parts of soft mono- and diglycerides, 2 to 8 weight parts of ethoxylated monoglyceride, 0 to 8 weight parts of solid stearine dispersed in at least about 40 weight parts of liquid vegetable oil to produce a substantially uniform dispersion. The concentrate is ordinarily diluted for use in baking processes to provide up to about 100 weight parts of liquid vegetable oil in the fluid shortening mixture which is a desirable fluid shortening for use in continuous bread-making process and the like.

Still a further advantageous aspect of this invention is that the fluid shortening can be effectively hydrated with water whereby a hydrated fluid shortening system is achieved and can be advantageously utilized in continuously mixed processes for breads, buns, rolls, and the like. In addition to processing advantages, the hydrated fluid shortening, an oil in water emulsion system, provides increased functionality in the food products wherein improved specific volume is achieved as well as improved quality. Stabilized physical and chemical interaction between the hydrated fluid shortening and other bread dough ingredients is realized in the baking process.

Hydrated fluid shortening comprises between about 30 to 70 weight parts of non-concentrated fluid shortening with the remainder being water. Preferably, the hydrated fluid shortening contains about 45 to 55 weight parts fluid shortening mixed with about 55 to 45 weight parts water. The hydrated fluid shortening can be produced by high-speed mixing, but preferably is produced by votating a blended mixture of water and fluid shortening. The blended mixture enters a Votator A unit at a temperature of about 125° to 135°F, is votated therein, and then exits at about 67°F to 77°F. The mixture then enters the Votator B unit, is votated therein, and exits from the Votator B unit at temperatures between about 70°F to 80°F. The resulting votated mixture is a surprising stable hydrated fluid shortening. Apparently, votating the blended mixture of fluid shortening and water provides a fluid homogeneous mixture in addition to achieving a reduction of beta-crystal size of the lipid components which further improves the physical stability and handleability of the hydrated fluid shortening. The hydrated fluid shortening is a very stable, low viscosity hydrated fluid shortening which does not foam in use while intermixing the same into a bread-mixing process which is a substantial improvement over conventional hydrated shortening systems. Conventional hydrated shortening systems very often cause considerable foaming in use thereby causing inaccurate metering while pumping as well as disposing of the foam.

The following examples further illustrate this invention but are not to be construed as limiting the scope of this invention.

EXAMPLE 1

Fluid shortening was produced from the following ingredients:
  82 lbs. of soybean oil
  8 lbs. of soft mono- and diglycerides having at least 50% monoglyceride, an I.V. of 70, and a melting point of 120°F
  5 lbs. of ethoxylated mono- and diglycerides
  5 lbs. of soybean stearine.

A. The ingredients were charged into a holding tank, heated to 130°F, and agitated at temperatures of 130° to 135°F until a molten mixture was obtained.

B. The molten mixture was then pumped at a temperature of about 135°F to a first Votator unit "A" wherein the mixture was rapidly cooled to a chilled blend at a temperature of approximately 80° to 85°F.

C. The mixture was then pumped at a temperature of 80° to 85°F for through-put for working (mild agitation) through a Votator B unit wherein the chilled blend temperature was maintained at 82° to 86°F to produce a stabilized uniform dispersion. Holding time of the chilled blend within the Votator B unit was about one minute.

D. The fluid shortening mixture was then continually agitated at 80° to 90°F in a stehling tank at about 16 RPM for a period of at least about 40 hours to produce a stable fluid shortening.

E. The resulting stabilized fluid shortening was a substantially uniform dispersion with the following characteristics:
  a. Stability:
    After 20 hours of fluidization, there was 0% dissociation. After 40 hours of stehling, there was 0% dissociation measured by a centrifuge test using a 50 ml. graduated test tube and centrifuging at 2000 RPM for 15 minutes.
  b. Viscosity:
    After 20 hours of fluidization, viscosity of the fluid shortening was 575 cps as measured by Brookfield Model LVT using a No. 3 spindle at 60 RPM.
    After 40 hours of fluidization, viscosity of the fluid shortening was similarly measured to 520 cps.
  c. Solids Fat Profile:
    Measurement was by American Oil Chemical Society Test No. CD-10-57
    50°F yielded 7–9 SFI units
    70°F yielded 7–9 SFI units
    92°F yielded 6–7 SFI units
    104°F yielded 5–6 SFI units.
  d. Long Term Stability:
    After 70 days, less than 2% separation by volume resulted from centrifuging 15 minutes at 2000 RPM.
  e. Beta-Polymorphic Form: Conversion to the beta-crystal form was 100% as measured by Test No. .0036*

*Durkee Internal Test No. 0.0036 is a test wherein the polymorphic forms are characterized using a Phillips X-ray Diffractometer coupled with a strip chart recorder. The copper target tube was operated at 30 KV potential and 15 MA current. The radiation, K, was filtered with a nickel filter. The scanning range of the goniometer was 17.0° to 25.0° at a rate of 0.5° per minute (2 $\theta$, the angle of diffraction used for short spacings). Test samples are prepared by filtering a sample of fluid shortening placed in a No. 5 filter paper loaded in a Buchner Funnel operating for 5 minutes at full water aspirator pressure. The solid cake remaining on the filter paper was packed into diffraction holders and tested. Polymorphic forms are identified by noting the positions of the peaks on the x-ray pattern which is a plot of intensity of diffracted rays vs. angle of diffraction recorded. Polymorphic forms are identified in accordance with the following scheme:
$\alpha$ (alpha) form displays one peak at 21.5°
$\beta$ ' (beta prime) form displays two peaks at 21.3° and 23.7°
$\beta$ (beta) form displays three peaks at 19.4°, 23.0°, and 24.0°
$\beta$ is the stablest polymorphic form for all aminol or vegetable fats.

EXAMPLE 2

Fluid shortening of Example 1 was pumped from a holding tank at a temperature of about 70°F and introduced into a block process in a continuous-mix bread formula wherein the ratio of 1.86 pounds of fluid shortening was mixed with brew of the following composition:
  2 lbs. of sugar
  2 lbs. of salt
  3.25 lbs. of yeast
  0.75 lbs. of yeast food
  67.0 lbs. of water
  15/16 ppm of $KIO_3/KBrO_3$
  0.1 lbs. of sodium propionate mold inhibitor (Mycoban);
and spike of the following composition
  2 lbs. high heat milk solids
  5 lbs. of sugar.

The fluid shortening of Example 1 was pumped directly from the bulk holding tank and mixed with the brew and spike of the foregoing indicated ratios in a mixing unit and thereafter introduced into a developer head used in the continuous-mix bread process. The continuous intermixing of the fluid shortening with the brew, spike, and sufficient flour wherein the ratios are as follows:
- 14 grams per minute of fluid shortening (3.5% based on flour)
- 328 grams per minute of brew and spike
- 400 grams per minute of flour.

The resulting dough was maintained at a temperature of about 98°F to 102°F and extracted into 15.5 ounce bread loafs and baked to produce standard bread loafs. The bread loafs had increased softness and increased shelf life. Further favorable bread properties were realized including excellent volume, crumb, crust, grain, texture, side walls, and flavor, excellent slicing properties, excellent bread packaging, and excellent storage properties.

EXAMPLE 3

Bread loafs were made in a manner similar to Example 2 but utilizing a conventional fluid shortening based on hard mono and diglycerides having an iodine value of less than 5. The bread loafs were compared with bread loafs of Example 2 with the following results as tested by Test No. .0049.**

TABLE 1

| Bread Loaf Sample | 1 day | 4 days | 7 days |
|---|---|---|---|
| a) Example 2 made with fluid shortening of this invention | E=13.5 | E=28.9 | E=38.9 |
| b) Example 3 made with conventional fluid shortening | E=18.0 | E=32.4 | E=45.9 |

**Test No. .0049 is an Instron procedure test for measuring bread softness and conducted on a table model Instron Unit coupled with a strip chart recorder and an integrator. The CB Censor Cell of the Instron had a load range of 0–2000 grams, and the aluminum cylindrical probe was 3 centimeters by 2.5 centimeters. The test sample was produced by placing a test loaf into a bread slicing miter box with slots and slicing the test loaf into 2-inch sections. Softness measurements were conducted on two segments of each loaf which adjoins the center slice in the direction of the closest end. The integrator reading was reported by compressing the crumb to a depth of 0.5 inches at a crosshead rate of 0.5 inch per minute with the probe positioned approximately at the center of the slice and exactly on the testing surface. A value E was obtained as a relative measure of softness of the bread wherein higher values of E reflect a firmer bread product. E is a unit of work or energy calculated from the following formula:

$$E = X/5000 \cdot L \cdot S,$$

Wherein
- $E$ = the energy in inch-gram
- $L$ = the full-scale load in grams
- $S$ = the rate of compression
- $X$ = the integrated value.

EXAMPLE 4

Fluid shortening was made in a manner similar to Example 1 from the following ingredients:
- 87 lbs. of soybean oil
- 8 lbs. of soft mono- and diglycerides having at least about 50% monoglyceride, and an I.V. of 65 and a melting point of 125°F
- 5 lbs. of ethoxylated mono- and diglycerides.

This fluid shortening was utilized in a continuous-mix bread process similar to Example 2 and similar favorable results were achieved.

EXAMPLE 5

Fluid shortening was made in a manner similar to Example 1. The ethoxylated mono- and diglycerides were replaced with an equal amount of other ester emulsifier. The results are compared in Table 2 below indicated as a variable of ester emulsifier.

TABLE 2

| Ester Emulsifier | Specific Volume | % Shock Volume | Instron 1 day | Instron +5 days | Instron 7 days | Score |
|---|---|---|---|---|---|---|
| 1) Polyoxyethylene (20) sorbitan monostearate | 6.26 | 14.6 | 16.9 | 32.1 | 47.4 | 85 |
| 2) Polyoxyethylene (20) monooleate | 6.20 | 16.8 | 19.4 | 38.9 | 50.4 | 83 |
| 3) Polyoxyethylene (20) sorbitan tristearate | 6.12 | 21.6 | 21.2 | 37.0 | 55.4 | 76 |
| 4) Sodium stearoyl 2-lactylate | 6.20 | 40.0 | 19.4 | 38.3 | 57.1 | 79 |
| 5) Succinylated monoglyceride | 6.00 | 26.7 | 20.0 | 36.6 | 59.1 | 72 |
| 6) Ethoxylated (20) monoglyceride | 6.61 | 7.5 | 16.2 | 28.9 | 46.6 | 88 |

EXAMPLE 6

Concentrated fluid shortening was produced in accordance with this invention from the following ingredients by weight:
- 40 parts of soybean oil
- 8 parts of soft mono- and diglycerides having at least about 50% monoglyceride and an I.V. value of 70 and a melting point of 125°F
- 5 parts ethoxylated mono- and diglycerides
- 5 parts soybean stearine.

A. The foregoing ingredients were charged into a holding tank, heated to at least 130°F, and agitated at temperatures of about 130° to 135°F until a molten mixture was obtained.

B. The molten mixture was then pumped at a temperature of about 135°F to a first Votator A unit wherein the mixture was quickly reduced to a mixture temperature of approximately 80° to 85°F.

C. The mixture was then pumped at a temperature of 80°F to a holding tank Votator "B" unit wherein the mixture temperature was maintained at 82° to 86°F.

D. The fluid shortening mixture was then continuously agitated in a stehling tank at about 16 RPM for a period of at least about 6 hours to produce a stable concentrated fluid shortening which was thereafter pumped to a storage facility.

E. The concentrated fluid shortening was then pumped from the storage facility to a mixing tank and mixed with 42 weight parts of soybean oil by continuous agitation in a stehling tank at about 16 RPM for a period of at least eight hours to produce a fluidized diluted liquid shortening with characteristics comparable to those obtained in Example 1, subpart D.

EXAMPLE 7

Buns and rolls were produced utilizing the fluid shortening of Example 1 in accordance with the following formula:
6 lbs. of fluid shortening from Example 1
100 lbs. of flour
64 lbs. of water
2.5 lbs. of salt
3.0 lbs. of yeast
0.5 lbs. of yeast food
6 lbs. of sugar
0.3 lbs. of sodium propionate (mold inhibitor)
2.0 lbs. of milk solids non-fat.

The developed dough had excellent machineability through automatic processing equipment wherein the dough was not sticky and did not tear apart.

The baked buns and rolls characteristically had excellent volume, crumb, crust, texture, and shelf life.

EXAMPLE 8

Fluid shortening of Example 1 was mixed with water in proportions indicated in Table 3 below, fed at a temperature of about 115°F to Votator A unit, votated therein with a dwell time of about 1 minute, discharged at a temperature of about 73°F and fed to a Votator B unit, votated therein with a dwell time of about 1 minute, and discharged at a temperature of about 75°F. The ratios of fluid shortening to water are weight ratios. The resulting stability and viscosity are indicated in Table 3.

TABLE 3

| Hydrated Fluid Shortening | | | |
|---|---|---|---|
| Fluid Shortening | Water | Stability | viscosity |
| 90 | 10 | Non-stable | N.G. |
| 80 | 20 | Non-stable | N.G. |
| 70 | 30 | Smooth and Stable | 2240 cps. |
| 60 | 40 | Smooth and Stable | 1320 cps. |
| 50 | 50 | Smooth and Stable | 480 cps. |
| 40 | 60 | Smooth and Stable | 480 cps. |
| 30 | 70 | Smooth and Stable | 120 cps. |
| 20 | 80 | Non-stable | N.G. |
| 10 | 90 | Non-stable | N.G. |

EXAMPLE 9

About 3.92 lbs. of the hydrated fluid shortening of the 50/50 blend in Table 3 was mixed with the following:
Brew:
2.00 lbs. granulated sugar
2.00 lbs. salt
3.25 lbs. yeast
0.75 lbs. yeast food
3.73 lbs. fluid shortening of Example 1
67.00 lbs. water
15/16 ppm. $KIO_3/KBrO_3$
0.1 lb. sodium propionate
Spike:
2 lbs. high heat milk solids
5 lbs. sugar The fluid shortening, brew, and spike were continuously mixed and processed in a continuous baking process whereby the final bread product contained 3.5% of shortening based on flour. No foaming was encountered although the brew was pumped continuously for two hours in a continuous-mix bread process. Table 4 indicates the results of test evaluations on the bread products.

TABLE 4

| Property | Neg. Control | cc/gm Control Ex. 1 | Hydrated (Ex. 9) |
|---|---|---|---|
| Specific Volume | 6.08 cc/gm | 6.46 | 6.70 cc/gm |
| Percent Shock | 53.7% | 20.8 | 19.8% |
| Instron | | | |
| 1 day | 22.5 | 16.6 | 16.5 |
| 3 days | 55.1 | 29.4 | 28.9 |
| 7 days | 65.5 | 43.8 | 43.2 |
| Score | 70 | 86 | 87 |

The foregoing examples are illustrative of the advantages of the fluid shortening of this invention based on soft mono- and diglycerides to produce substantially uniform dispersion having increased long term stability. The examples are not intended to be limiting except as defined in the following claims.

I claim:

1. In a process for making yeast raised bakery products containing shortening the improvement comprising preparing a fluid shortening by:

heating a mixture of soft mono- and diglycerides, ester emulsifiers, solid stearine, and liquid vegetable oil to form a liquefied molten mixture, said mixture comprising by weight 4 to 14 parts of said soft monoand diglycerides derived from vegetable oil and having an iodine value of at least 40, 2 to 8 parts of said ester emulsifiers selected from the group consisting of ethoxylated monoglyceride, ethoxylated sorbitan, ethoxylated mannitan, ethoxylated monooleate, sodium stearoyl-1-lactylate, calcium stearoyl-2-lactylate, sodium stearoyl-2-lactylate, ethoxylated propylene glycol monoesters, ethoxylated triglycerol monostearate, and succinylated monoglyceride, 2 to 8 parts of said solid stearine, and about 40 to 100 parts of said liquid vegetable oil;

rapidly cooling said molten mixture to a temperature between about 82° to 88°F to initiate beta-crystal formation and produce a chilled blend having dispersed fat crystals;

working said chilled blend at temperatures between 82° to 88°F to develop beta-crystal formation and produce a substantially uniform dispersion containing beta-fat crystals are in equilibrium with said liquid vegetable oil; and fluidizing said uniform dispersion by agitating at temperatures of 80° to 90°F for time sufficient to complete the beta-crystal formation and produce a stabilized fluid shortening.

* * * * *